(12) United States Patent
Clark et al.

(10) Patent No.: US 8,114,454 B2
(45) Date of Patent: Feb. 14, 2012

(54) PET FOOD COMPOSITION AND METHOD

(75) Inventors: Harry M. Clark, Topeka, KS (US);
William D. Schoenherr, Hoyt, KS (US);
Craig R. Cowley, Meriden, KS (US);
Kim G. Friesen, Carthage, IN (US)

(73) Assignee: Hill's Pet Nutrition, Inc., Topeka, KS (US)

( * ) Notice: Subject to any disclaimer, the term of this patent is extended or adjusted under 35 U.S.C. 154(b) by 64 days.

(21) Appl. No.: 12/398,536

(22) Filed: Mar. 5, 2009

(65) Prior Publication Data
US 2009/0169695 A1 Jul. 2, 2009

Related U.S. Application Data

(63) Continuation of application No. 10/958,128, filed on Oct. 4, 2004, now abandoned.

(51) Int. Cl.
*A23P 1/12* (2006.01)
(52) U.S. Cl. ........ 426/465; 426/513; 426/516; 426/518; 426/523; 426/805; 425/282.4; 425/464
(58) Field of Classification Search .................. 426/646, 426/465, 513, 516, 518, 523, 805; 425/289, 425/382.4, 464
See application file for complete search history.

(56) References Cited

U.S. PATENT DOCUMENTS

| | | | |
|---|---|---|---|
| 3,192,047 A | 6/1965 | Moyle et al. | |
| 3,627,537 A | 12/1971 | Beck et al. | |
| 3,666,491 A | 5/1972 | Touba | |
| 3,870,805 A * | 3/1975 | Hayes et al. | 426/656 |
| 4,031,267 A * | 6/1977 | Berry et al. | 426/656 |
| 4,128,372 A * | 12/1978 | Rose et al. | 425/311 |
| 4,256,771 A | 3/1981 | Henderson et al. | |
| 4,534,992 A * | 8/1985 | Taguchi et al. | 426/656 |
| 4,759,942 A | 7/1988 | Von Fulger et al. | |
| 4,888,198 A | 12/1989 | Beery et al. | |
| 4,971,820 A | 11/1990 | Likuski et al. | |
| 4,981,711 A * | 1/1991 | Kearns et al. | 426/1 |
| 5,149,555 A * | 9/1992 | Flindall | 426/448 |
| 5,186,964 A | 2/1993 | Gierhart et al. | |
| 5,500,239 A * | 3/1996 | Hayward | 426/516 |

(Continued)

FOREIGN PATENT DOCUMENTS
EP 0720816 7/1996
(Continued)

OTHER PUBLICATIONS

Diez M. et al., "Weight Loss in Obese Dogs: Evaluation of a High-Protein, Low-Carbohydrate Diet," Journal of Nutrition, J. Nutr. (2002) pp. 1685S-1687S vol. 132.

*Primary Examiner* — Drew E Becker
(74) *Attorney, Agent, or Firm* — Shannon McGarrah

(57) ABSTRACT

The present invention relates to methods for producing dimensionally stable low carbohydrate pet food compositions.

6 Claims, 2 Drawing Sheets

U.S. PATENT DOCUMENTS

| | | | |
|---|---|---|---|
| 5,516,472 A * | 5/1996 | Laver | 264/118 |
| 5,538,748 A | 7/1996 | Boatman et al. | |
| 5,620,737 A * | 4/1997 | Kazemzadeh | 426/641 |
| 5,720,987 A * | 2/1998 | Ploog | 425/131.1 |
| 5,722,346 A | 3/1998 | Tremblay et al. | |
| 5,783,240 A * | 7/1998 | Wenger et al. | 426/231 |
| 6,103,290 A | 8/2000 | Wenger | |
| 6,203,825 B1 * | 3/2001 | Hodgkins | 426/2 |
| RE37,235 E * | 6/2001 | Hauck et al. | 99/348 |
| 6,296,465 B1 * | 10/2001 | Deutsch et al. | 425/133.1 |
| 6,358,546 B1 * | 3/2002 | Bebiak et al. | 426/232 |
| 6,410,063 B1 * | 6/2002 | Jewell et al. | 426/2 |
| 6,635,301 B1 * | 10/2003 | Howsam | 426/574 |
| 7,585,533 B2 * | 9/2009 | Fritz-Jung et al. | 426/454 |
| 2006/0019009 A1 * | 1/2006 | Keller et al. | 426/516 |
| 2008/0102165 A1 * | 5/2008 | Ning et al. | 426/72 |

FOREIGN PATENT DOCUMENTS

| | | |
|---|---|---|
| JP | 04-300709 | 10/1992 |
| WO | WO 92/03931 | 3/1992 |
| WO | WO 98/16121 | 4/1998 |
| WO | WO 00/76002 | 12/2000 |
| WO | 0111964 A1 | 2/2001 |
| WO | WO 01/47370 | 7/2001 |
| WO | WO 01/95739 | 12/2001 |
| WO | 2004089107 A1 | 10/2004 |
| WO | 2004107878 A1 | 12/2004 |

* cited by examiner

PET FOOD COMPOSITION AND METHOD

CROSS-REFERENCE TO RELATED APPLICATIONS

This application is a continuation of U.S. application Ser. No. 10/958,128, which was filed on Oct. 4, 2004 and is pending, which is a continuation-in-part application of U.S. application Ser. No. 10/405,742, which was filed Apr. 2, 2003 and is abandoned, each of which is incorporated herein by reference.

BACKGROUND OF THE INVENTION

Dry pet foods for dogs and cats have been primarily prepared by extrusion. A heated food mass which is sufficiently plastic to be extruded using an ordinary screw extruder wherein expansion of the food occurs is worked in the extruder and emerges from the extruder usually in a strand or flat type rectangular sheet, depending upon the die shape, and is then cut and/or shaped into discrete particles. In this manner, dry diets utilizing kibbles, a particular discrete particle, are prepared. These kibbles should be dimensionally stable. That is, they retain the same shape as when immediately prepared and then packaged. They do not spontaneously crumble or lose fines to any great extent, even when subjected to mild pressure. Over time the physical and dimensional stability of the kibble is maintained.

This physical integrity of the extruded shape is at least partially dependent upon the chemical nature of the extruded material. When carbohydrate content is low, generally below about 19 wt % of the food composition, expansion of the food mass during the extrusion process is significantly reduced because of the reduced matrix formation generally obtained from the presence of carbohydrate such as a starch or grain. The relatively low carbohydrate, high protein, high fat food masses when extruded under normal conditions do not expand significantly, thereby providing a discrete particle which is not dimensionally stable. Additionally, the discrete particle can have difficulty retaining added fat, particularly when the fat is added to the outside of the particle, such as by spraying. Such extruded particle is not dimensionally stable and can not be packaged for appropriate commercial use.

It has now been discovered that a relatively low carbohydrate, relatively high protein and fat content pet food can be successfully extruded into a discrete particle, which is dimensionally stable. It has the physical attributes of typical commercial pet foods which include much higher levels of carbohydrate. Additionally where fat absorption can be a problem, the article matrix is able to absorb and retain fat.

SUMMARY OF THE INVENTION

In accordance with the invention, there is a method of producing a dimensionally stable low carbohydrate pet food.

A further aspect of the invention is the resulting dimensionally stable low carbohydrate pet food which is capable of inducing ketosis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
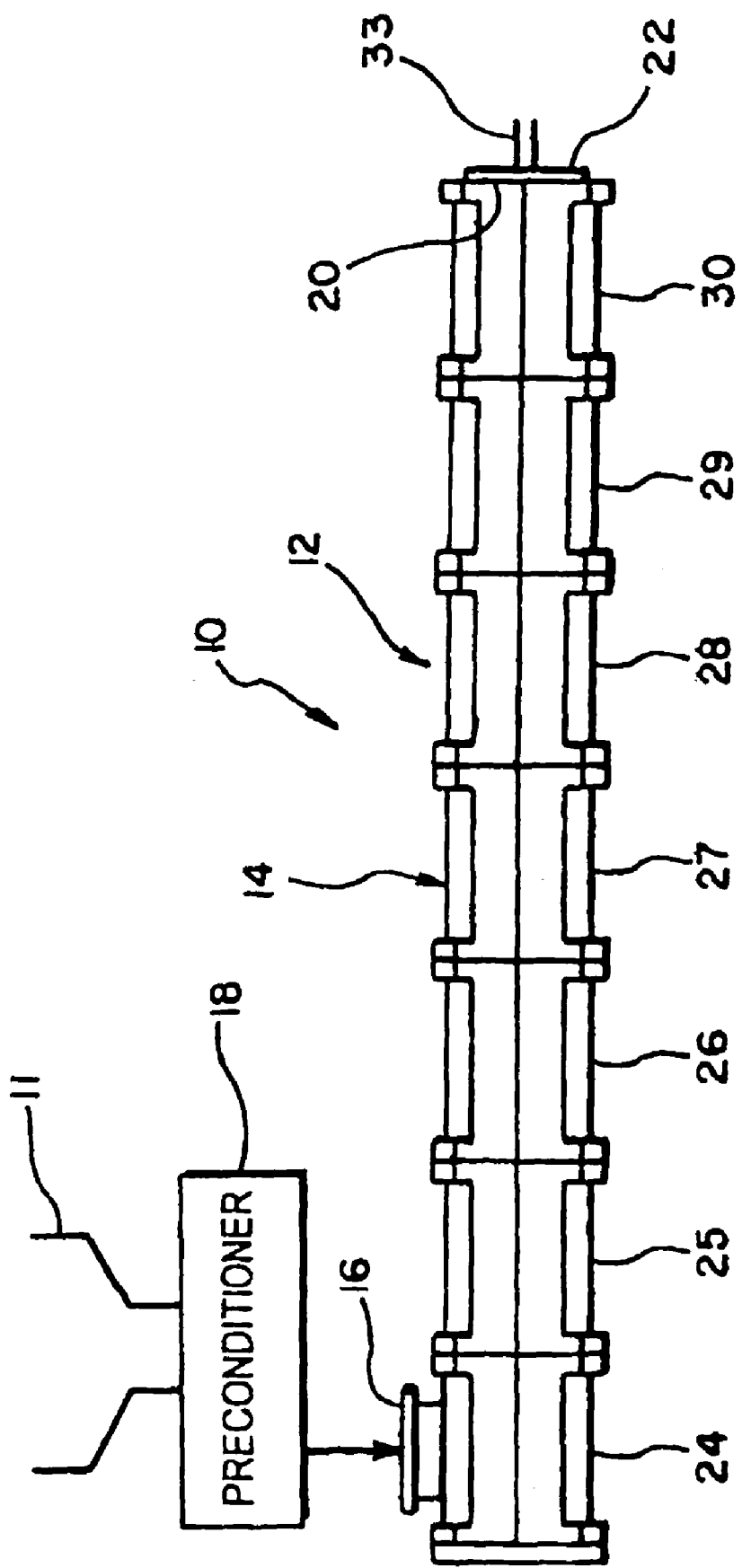
FIG. 1 is a schematic representation of an extension device used in the practice of the present invention.

The following description of the preferred embodiment(s) is merely exemplary in nature and is in no way intended to limit the invention, its application, or uses.

The pet foods included are those useful primarily for dogs and cats. These foods are high in protein and fat and contain a relatively small amount of carbohydrate as compared to protein and fat. The resulting pet foods are dry as opposed to a wet chunk and/or gravy. Protein levels are a minimum of about 25, 30, or 40 wt % of the overall composition with a maximum of about 50, 60 or 70 wt % of the composition. The fat content is a minimum of about 15, 20, 25 or 30 wt % and not to exceed about 70, 60, 50 or 45 wt %. The carbohydrate content based on nitrogen free extract, "NFE", is a minimum of zero, 5 or 7 with a maximum of about 22, 15 or 10 wt %. All numbers are on a dry matter basis. When the term diet is used, this refers not only to a food product which provides most, if not all, the nutrition for a pet but also refers to such items as a snack, treat or supplement and the like.

The protein can come from any source but because of the relatively low carbohydrate level, a protein source with low carbohydrates is particularly preferred. Examples of such protein sources are animal sources such as pork protein isolate and veal protein isolate and the like as well as vegetable sources such as soy protein isolate, corn gluten meal and the like.

The fat source can be any source, which provides fat to the pet food. Examples of such sources are beef tallow, poultry fat, soybean oil, canola oil, sunflower oil, fish oil, lard and choice white grease. The fat can be incorporated completely within the pet food, deposited on the outside of the food or a mixture of the two methods. Generally, fat on the exterior of the food brings about an increase in palatability to the pet.

Very little, if any, carbohydrate is initially present in the food. The carbohydrate can enter the food as part of another source such as protein but also can be present through specifically added carbohydrate sources such as starches and grains. Examples of such carbohydrate sources include a starch such as corn starch or wheat starch or mixtures thereof and a grain which can be greater than 50% starch such as corn, sorghum, barley, wheat, rice and the like as well as mixtures thereof. A specific carbohydrate source such as a starch, however, is not necessary.

The preparation of a dry extruded pet food with the very low quantity of carbohydrate therein, with discrete particles which are dimensionally stable is not readily accomplished. By "dimensionally stable" it is meant that the resulting extruded product when sufficiently dried has physical integrity i.e., not readily losing its shape or shedding significant amounts of fines, particularly when the food is in discrete particles such as kibbles, bits and the like in a bag filled with the materials. Additionally, such a food often does not readily retain its fat content in a cohesive manner, particularly when the fat is deposited on the exterior of the discrete particle. Non-adherence can be visually observed. These problems are further accentuated by using a high quantity of protein. Protein isolates, which are generally used when there is a high protein content, particularly the vegetable isolates, make it even more difficult to successfully extrude a dry pet food having discrete particles which are dimensionally stable.

Utilizing a standard single screw extruder with a preconditioner, under standard operating conditions dimensionally stable discrete particles of the pet food described herein were not obtainable. After much work, it was found that increasing the shear in the extruder created an extruded pet food which was processed into discrete particles which were dimensionally stable even with the relatively low levels of carbohydrate described herein. The increased shear produces a pet food discrete particle, which is generally of a higher density than the discrete particle produced under normal shear processing conditions. Increased shear during the processing can be produced by various means such as for example using cut flight screws, lobe locks, steam locks, and straight ribbed liners.

Another means for increasing the shear of the pet food compositions described herein is through the use of a metal Venturi plate which covers or essentially covers the cross section of the extruder. The Venturi plate which contains a limited number of through-holes, preferably a single through-hole, increases shear by restricting extrudate flow in the extruder barrel. The discrete particles prepared by passing through the Venturi plate generally of a greater density than particles produced without such an apparatus. They are dimensionally stable in that they resist crumbling and do not form a significant level of fines after preparation.

By utilizing a Venturi plate in the extrusion process to increase shear certain processing problems are addressed. First, the formulation is designed to be low in starch which limits the cohesive nature of an extruded product and hence its ability to form discrete particles in the absence of increased shear. Secondly, the balance of the formulation is generally vegetable based protein which is by nature very difficult to extrude and cook. By increasing shear a dimensionally stable product optionally including a significant level of vegetable based protein is possible.

In preparing the low carbohydrate pet food by the method of the present invention, a mixture of carbohydrates, protein, fats and sufficient vitamins and minerals selected to yield a low carbohydrate dimensionally stable pet food is mixed and preconditioned or moisturized within a preconditioner or mixing cylinder wherein the ingredients are contacted with steam and moisture. The moisturized mixture is then introduced into the barrel of an extruder, which can be either a single or twin screw type extruder, which cooks the mixture to yield an extruded product. The extruder barrel is provided with at least one helical screw which axially rotates to advance the material through the extruder barrel.

Preferred processing conditions involve initially preconditioning dry food ingredients to uniformly moisturize and precook materials and form an at least partially sterilized mixture for passage into the apparatus of the present invention. In this connection, preconditioning of this type normally involves injection of water and/or steam with intense mixing. Advantageously, the moisture level of the initial ingredients ranges from about 10-14% by weight, and, after preconditioning, this moisture level is typically elevated to a level of from about 20-30% by weight, and more preferably from about 20-25% by weight, MCWB (moisture content, wet basis).

In terms of temperature, it is preferred to elevate the temperature of the mixture in the preconditioner to a level of from about 160-210° F., and more preferably from about 190-205° F. The residence time of the mixture within the preconditioner will depend upon the equipment selected and the degree of mixing desired; generally speaking, however, the average residence time of the food mixture in the preconditioner should be from about 0.5-8 minutes, and more preferably from about 4-7 minutes.

After preconditioning, the food mixture is fed into the extruder barrel and is conveyed by the screw toward the outlet end of the barrel. The temperature of the food mixture within the barrel is generally maintained at about 165-240° F., and preferably from about 180-240° F.

During passage through the extruder, the food mixture is subjected to increasing amounts of shear and pressure. The maximum pressure conditions achieved in the extruder barrel generally ranges from about 250-500 psi. The screw rpm (revolutions per minute) generally ranges from about 250-500 rpm. Also during such passage, moisture may be added directly to the food material passing through the barrel, in the form of injected water and/or steam.

The food mixture exiting the extruder barrel outlet passes directly into the die assembly of the present invention, whereupon the mixture is forced outwardly as a strand through the orifices of the die plate in a state of laminar flow. The extrudate strand is then sliced into appropriate sized pieces by rotating knives or other suitable cutting means. The moisture level of the sliced pieces is-from about 15-25% by weight, and more preferably from about 18-22% by weight.

Figure 2:
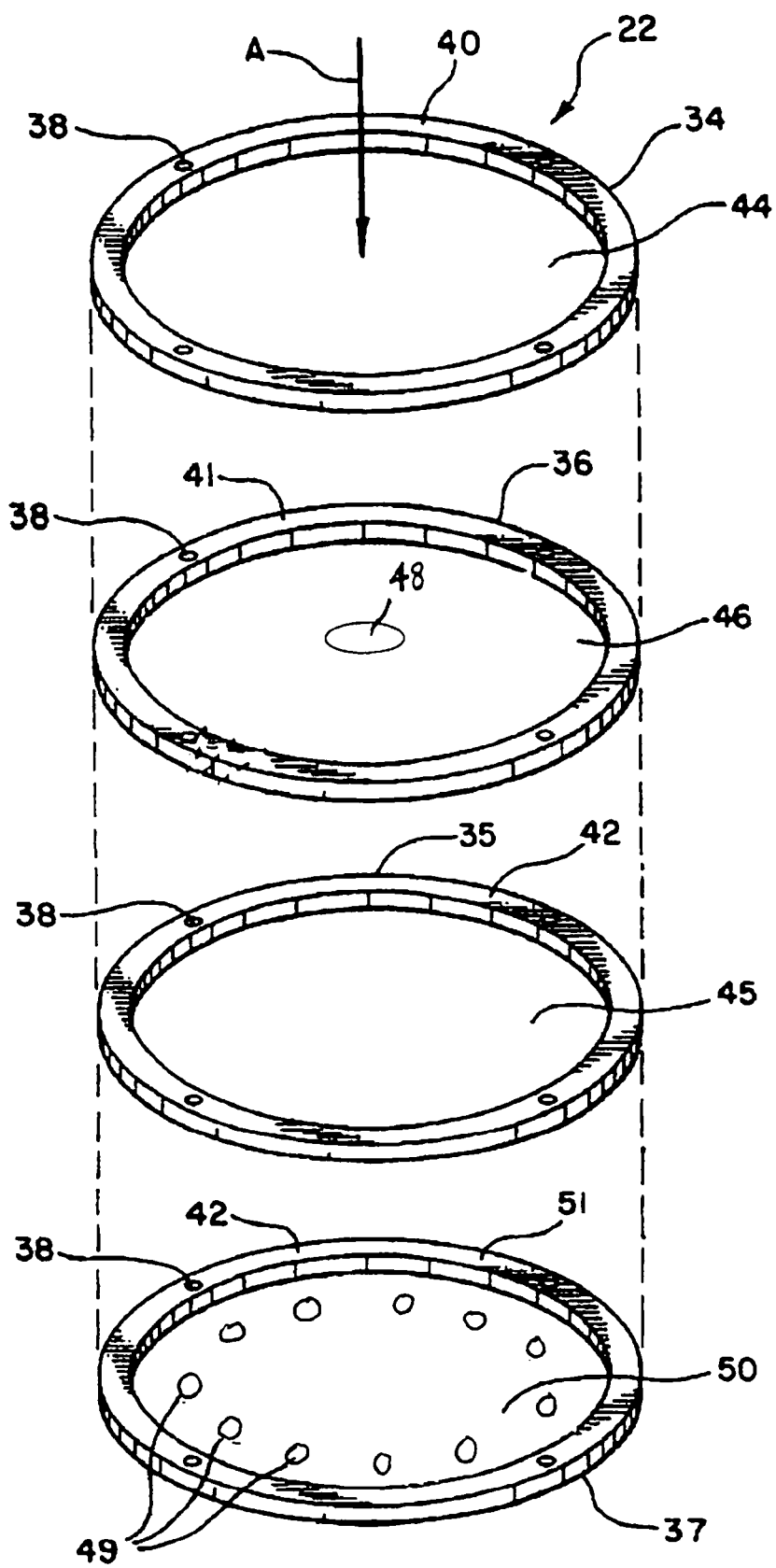
FIG. 2 is a schematic representation (exploded for illustrative purposes) of a modified die assembly used in the present invention for the manufacture of weight control compositions.

Turning now to FIGS. 1-2, in FIG. 1 the extrusion apparatus 10 includes an extruder 12 having a barrel 14 with an inlet 16 located below the outlet of a preconditioner 18; the extruder 12 also having an outlet 20 to which is affixed a die assembly 22. Hopper 11 is provided to premix the ingredients prior to preconditioning. The barrel 14 as depicted in FIG. 1 comprises seven barrel sections 24, 25, 26, 27, 28, 29, 30, although the number of barrels may vary without departing from the principles of the present invention. The barrel sections are interconnected to provide an elongated bore through the barrel 14 of the extruder 12. A material advancing screw (not shown) is received in the bore of the barrel and is intermeshed along the majority of the length of the extruder barrel 14 and terminate at outlet 20. The screw feeds the food mixture to and through the die assembly 22 at an appropriate velocity and in a state of laminar flow. Extrusion apparatus 10 of the type illustrated in FIG. 1 is available from the Wenger Manufacturing Company such as the Wenger X-135. The pre-conditioner 18 shown in FIG. 1 is also manufactured by the Wenger Manufacturing Company.

In preparing the pet food product of the present invention, the ingredients are first mixed in a mixer such as a ribbon mixer and fed to hopper 11. The mixed ingredients are metered into the preconditioner 18, at a rate between 200 and 300 lbs./min. and is further mixed with water which is introduced into the preconditioner at a rate of 10 to 40 lbs./min. The temperature of the mixture is raised from ambient to 170° to 210° F. by the injection of steam into the preconditioner 18 at the rate of 10 to 40 lbs./min. Total residence time in the preconditioner 18 generally ranges from 0.5 to 3.5 minutes.

Once the mixture of the ingredients and water is introduced into the extruder barrel 14, the mixture is advanced along the length of the barrel 14 by axial rotation of the screws. The mixture is sequentially advanced through the extruder and finally through the die assembly 22.

The die assembly 22 as shown in FIG. 2 consists of Venturi plate 36 and a die plate 37 mounted in clamped parallel engagement between first and second spacer plates 34 and 35. These plates are mounted on the outlet end 20 of the extruder barrel 14 by a plurality of bolts (not shown) which extend through bolt receiving holes, designated generally by the numeral 38, formed on the peripheral faces 40, 41, 42 and 43 of the aforementioned plates.

The first spacer plate 34 shown in FIG. 2 has an annular opening 44 which extends through the plate 34 and corresponds in diameter to the annular opening 45 of the second spacer plate 35. The diameter of the annular openings 44 and 45 of the spacer plates 34 and 35 is generally about 3.5 to about 4.5 inches and preferably about 3.75 to 4.25 inches. While the foregoing sizes are appropriate for certain extruder models, it should be understood that the size and process parameters will vary depending on the extruder model employed.

The annular opening 44 of the first spacer plate 34 is of sufficient length along the axis of extrusion to stabilize and streamline, i.e., impart a more smoother flow to, the plasticized food mixture stream being advanced therethrough causing the fibrous material in the food mixture to be compressed to a dense, randomly structured, plastic state. Typically the spacer plate 34 has a length of about 0.25 to about 1.0 inch, preferably about 0.35 to about 0.75 inch to provide for such food stream stabilization.

The Venturi plate 36 which is clamped between first spacer plate 34 and second spacer plate 35 is comprised of a limited number of through-holes generally designated by the numeral 48 which are cut into and extended through the core 46 of plate 36. The diameter of core 46 of the Venturi plate 36 corresponds to the diameter of the annular openings 44 and 45 of the spacer plates 34 and 35.

Under certain embodiments, a single through-hole 48 is employed. The through-hole is of sufficient length along the axis of extrusion to separate and align the food structure in a preliminary pieced laminar configuration as the food mixture is advanced therethrough under pressure. An appropriate length of the through-hole 48 to achieve this preliminary alignment in the pet food mixture flowing therethrough is about 0.25 to 1.0 inches and preferably about 0.3 to 0.7 inches. The size and limited number of through holes cause the pet food composition to remain in the extruder longer thus increasing the amount of shear on the composition. With this increased shear dimensionally stable discrete particles are prepared with less than about 19.0 wt % carbohydrate on a dry basis. Breakage rates of the discrete particles processed through a die assembly including the Venturi plate appear to be on the order of less than 1% versus from 2.5 to 9% for the die assembly described in U.S. Pat. No. 5,500,239.

The annular opening 45 of the spacer plate 35 is of sufficient length along the axis of extrusion to allow the individual pieces to reform under pressure and present a mass to the orifices generally designated by the numeral 49 cut into the core 50 of the die plate 37.

The die orifices 49 of the die plate 37 are sufficient length along the axis of extrusion to promote the final alignment of the material in the food product mixture. An appropriate length of orifice 49 to promote alignment in the food product extrudate is about 0.5 to about 1.5 inches and preferably about 0.66 to about 1.0 inches. The die orifices which are substantially round as shown have a diameter of about 0.5 to 1.25 inches, preferably about 1.0 inch.

Upon discharge from the orifices 49 the pet food is cut to an appropriate length. While the die orifices are shown as being round, the die orifice shape may change as a function changes in the pet food formulation. The die orifices 49 may each have a specific shape which is the desired shape for the fiber striated pet food product.

Preferably, die orifices 49 which are circular in shape have die inserts inserted into them. Die inserts function to provide the desired shape to the product. By use of die inserts, die plate 37 need not be made specific for each particular shape desired, but, rather, die inserts can be produced for each particular shape. When a different shape than the one currently being produced is desired, die inserts can then be replaced, thereby eliminating the need for the replacement of die plate 37.

Die plate 37 preferably further comprises flange 51 which can be used to secure die plate 37 the outlet 20. Flange 51 most preferably has holes which correspond to the holes in complementary flanges on plates 34, 35 and 36 and the outlet 20. Bolts (not shown) or other conventional securing means can be disposed through the holes in die flange 51 and the corresponding holes of the other plates to secure die plate 37 to the die outlet.

The size of the food product formed by the orifices 49 of die plate 37 is dictated by a desire to obtain a high degree of dimensional stability, among other factors. Generally, it has been found that food pieces that the pet food pieces can be too large for comfortable consumption especially by smaller pets. On the other hand pieces which are too small may not convey the visual image desired in a pet food having visually distinct regions. For example, pet food pieces having a length of about 5.7 to 7.3 millimeter, a width of about 6.5 to 7.5 millimeters and a thickness of about 6.5 to 7.5 millimeters appear to be preferred by cats.

The components of the die assembly 22 can be made of any material providing the required structural integrity and sanitary characteristics such as a metal like stainless steel. Other characteristics which should be present in the material include thermal stability and corrosion resistance and approval from the United States Food and Drug Administration or other such agency for contact with food products is also beneficial.

The extrudate 33 as it is discharged from the orifices 49 of the die plate 37 is formed into food pieces by a slicing means (not shown) such as a rotating knife assembly which functions to slice the extrudate streams as they are discharged from the orifices 49 to form the product of this invention.

By flowing the food ingredient mixture through the die assembly 22 in accordance with the practice of the present invention at a velocity of about 12 to about 20 inches per second (in./sec.) a condition resembling laminar flow is created in the extrudate. As the food ingredient mixture passes through the barrel sections 24, 25, 26, 27, 28, 29, and 30, it is mixed, cooked and subjected to barrel temperatures in the range of about 100° to about 250° F., preferably about 170° to about 210° F. The food mixture is flowed through the die assembly 22 at a temperature of about 240° to about 320° F. Total residence time in the die assembly 22 is about 0.10 to about 0.35 seconds.

The pet food composition extrudate as it leaves the die assembly 22 has a moisture content between about 15 and about 30% by weight and preferably about 17 to about 24% by weight. The extrudate may swell upon exiting the die assembly 22 due to flashing of moisture to steam. The extrudate is cut into appropriate lengths to form pieces and then placed in an oven at 190° to 230° F. for 15 to 30 minutes to dry to about 7 to about 9% moisture. Following the dryer, the dried products otherwise referred to herein as kibble, are screened to remove fines and the products and are coated with additional liquid (fat) and dry ingredients designed to meet nutritional targets and to improve animal acceptability (palatability).

Below are two examples of an attempt to prepare a dimensionally stable discrete particle as well as a successful example. In all of the examples, a standard Wenger X 135 extruder was employed. It was equipped with an Acrison feeder and a DDC-7 preconditioning cylinder.

COMPARATIVE EXAMPLE 1

A pet food comprising 62 wt % corn gluten meal, 24 wt % poultry meal, 11 wt % soy isolate and 3 wt % minerals and vitamins had the following nutrient composition, with carbohydrates expressed in terms of NFE:

| Protein | 59.6% |
| --- | --- |
| Fat | 22.0% |
| Fiber | 0.85% |
| Carbohydrate (NFE) | 11.5% |

This formula was produced without the Venturi plate. The kibble was brittle. 10 to 25% of the dried kibble broke and was therefore unacceptable for sale. This product would not have been strong enough to withstand the harsh handling from the cooler to the packaging line. Fat absorption was a problem, as 2 to 10% of the fat would not stay within the kibble.

COMPARATIVE EXAMPLE 2

A pet food comprising 51 wt % corn gluten meal, 29 wt % poultry meal, 12 wt % pork protein isolate, 2 wt % dry egg and 5 wt % vitamins, minerals, and other nutrients had the following nutrient composition:

| Protein | 59.0% |
| --- | --- |
| Fat | 25.0% |
| Fiber | 0.85% |
| Carbohydrate (NFE) | 9.80% |

This formula was produced without the Venturi plate. The kibble was brittle and was greater than 10% broken. Fat absorption was an issue, as 2 to 5% of the fat did not bind to the matrix.

EXAMPLE 1

The same pet food as in Comparative Example 2 was produced under the same operating conditions but was processed with the presence of a Venturi plate (Wenger, Part No. 28299-3) with a 0.35 inch opening and a total diameter of 5.65 inches. A strong kibble was produced with less than 5% fines. The kibble did not have a fat absorption issue since less than 1% of the total fat was lost from the product.

As noted above, in addition to methods for producing a dimensionally stable low carbohydrate pet food, the composition has been found to induce ketosis which leads to weight loss. Over the course of a 28 day study, the efficacy of four dry formulations as set forth in the Table I with varying levels of carbohydrate NFE (14.2, 16.9, 18.6, and 21.6%) for inducing dietary ketosis in thirty-two obese cats during weight loss was evaluated. As demonstrated in Table II below, the foods were effective for weight loss in the obese cats in that, they lost an average of 0.243 kg of weight at a rate of 1.00% of initial body weight per week. On days 0, 14 and 28 of the study, serum levels of beta-hydroxybutyrate (BHBA) were analyzed. Cats fed the dry foods were mildly ketotic at the initiation of the study and they maintained the ketosis on day 14 of the experiment when compared with the initial values. The BHBA levels at the completion of the study remained elevated when compared with the levels at the initiation of the study for cats fed dry foods containing less than 21.6% carbohydrate on an NFE basis. This study demonstrated that obese cats fed a high protein, low carbohydrate, moderate fiber dry food lost weight at effective levels and dietary ketosis was maintained when dietary NFE levels were at or below about 19.0%. Cats fed dry foods with NFE level of 21.6% were not able to maintain ketosis at the completion of the 28-day study as demonstrated in Table II below. All foods were considered safe based on the lack of change in serum chemistry parameters.

TABLE I

| | Formulation No. | | | |
| --- | --- | --- | --- | --- |
| | 1 | 2 | 3 | 4 |
| NFE | 14.2% | 16.9% | 18.6% | 21.6% |
| Animal protein | 30.85 | 30.08 | 30.05 | 25.03 |
| Vegetable protein | 30.84 | 28.72 | 27.84 | 24.83 |
| Starch | 7.44 | 10.21 | 11.1 | 18.21 |
| Meat or soy isolate | 7.68 | 7.68 | 7.68 | 7.68 |
| Cellulose | 7.12 | 7.12 | 7.12 | 7.12 |
| Animal fat | 13.44 | 13.56 | 13.58 | 14.24 |
| Minerals | 1.29 | 1.29 | 1.29 | 1.54 |
| Vitamins | 1.34 | 1.34 | 1.34 | 1.34 |

TABLE II

Effect of Food on Weigh Loss in Obese Cats

| Formula Number | Weight Change, Kg | % Weight change/ week |
| --- | --- | --- |
| Formulation 1 | −0.17 | −0.70 |
| Formulation 2 | −0.22 | −0.90 |
| Formulation 3 | −0.26 | −1.04 |
| Formulation 4 | −0.32 | −1.26 |

TABLE III

Effect of Food on BHBA in Obese Cats Over Time

| Formula Number | Day 0 | Day 14 | Day 28 |
| --- | --- | --- | --- |
| Formulation 1 | 1.17 | 1.24 | 0.94 |
| Formulation 2 | 0.81 | 0.73 | 0.80 |
| Formulation 3 | 1.01 | 1.12 | 0.78 |
| Formulation 4 | 0.38 | 0.87 | 0.47 |

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A method of producing a dimensionally stable low carbohydrate pet food, the method comprising:
   providing a pet food composition having a low carbohydrate content based on nitrogen free extract of less than about 19 wt % on a dry basis;
   feeding the pet food composition through an extruder equipped at an outlet end with an increased shear die assembly, wherein said increased shear die assembly includes a first spacer plate attached on one side to said extruder and on another side to a Venturi plate, a second spacer plate attached to said Venturi plate along a side opposite said first spacer plate, and a die plate including orifices for shaping said pet food, wherein said Venturi plate includes a single through hole;

advancing the pet food composition through the die assembly at increased shear, wherein the pet food composition is advanced through the die assembly at a rate of about 12 to about 20 inches/second at a temperature of about 240 to about 320 degrees Fahrenheit;

and cutting the extruded pet food composition to the desired size whereby upon drying the composition a low carbohydrate dimensionally stable pet food product is obtained.

2. The method of claim 1, wherein said through hole has an average diameter of between about 0.5 to 1.25 inches.

3. The method of claim 2, wherein said through hole has an average diameter of about 1.0 inch.

4. The method of claim 1 wherein the orifices for shaping said pet food have an average diameter of between about 0.5 to 1.25 inches.

5. A method of preparing a low carbohydrate pet food in a form of dimensionally stable kibbles, the method comprising:

providing a pet food composition having a carbohydrate content based on nitrogen free extract of less than about 19 wt % on a dry basis;

feeding the pet food composition through an extruder having means for inducing increased shear at an outlet end thereof;

advancing the pet food composition at increased shear through a die assembly at the outlet end to form an extrudate, wherein said increased shear die assembly includes a first spacer plate attached to said extruder and on another said to a Venturi plate, a second spacer plate attached to said Venturi plate along a side opposite said first spacer plate, and a die plate including orifices for shaping said pet food, wherein said Venturi plate includes a single through hole, wherein the pet food composition is advanced through the die assembly at a rate of about 12 to about 20 inches/second at a temperature of about 240 to about 320 degrees Fahrenheit;

cutting the extrudate to a desired size; and drying the resulting pieces of extrudate to form dimensionally stable kibbles.

6. The method of claim 5 wherein the orifices for shaping said pet food have an average diameter of between about 0.5 to 1.25 inches.

* * * * *